United States Patent
Pelton et al.

(10) Patent No.: US 7,567,862 B2
(45) Date of Patent: Jul. 28, 2009

(54) ACTUATION RESPONSE OSCILLATION DETECTION MONITOR

(75) Inventors: David Andrew Pelton, Everett, WA (US); Dallin Brent Slaugh, Renton, WA (US); Michael Joseph Pabisz, Everett, WA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 11/838,525

(22) Filed: Aug. 14, 2007

(65) Prior Publication Data

US 2009/0048689 A1 Feb. 19, 2009

(51) Int. Cl.
*G01C 5/00* (2006.01)

(52) U.S. Cl. .................. 701/33; 701/9; 701/35

(58) Field of Classification Search .......... 701/29, 701/33, 34, 35, 36, 3, 4, 9; 244/75.1, 76 A, 244/76 R, 227
See application file for complete search history.

(56) References Cited

U.S. PATENT DOCUMENTS 5,806,805 A * 9/1998 Elbert et al. ............... 244/195

* cited by examiner

*Primary Examiner*—Richard M. Camby
(74) *Attorney, Agent, or Firm*—Yee & Associates, P.C.; Rosana S. Johnson

(57) ABSTRACT

A method, apparatus, and computer usable program code for monitoring an actuator for a control surface on an aircraft. In one advantageous embodiment, an error signal generated is received in response to sending a command to the actuator to move the control surface on the aircraft. Responsive to receiving the error signal, an amplitude and a frequency are identified for the error signal. A determination is made as to whether the amplitude exceeds a set of amplitude limits for the frequency, wherein each amplitude in the set of amplitude limits is associated with a requirement in a set of requirements. An exceedance count is incremented for each requirement in the set of requirements in which an associated amplitude limit has been exceeded by the amplitude to form an updated set of exceedance counts. A fault indication is generated if any exceedance count in the updated set of exceedance counts is greater than a threshold.

20 Claims, 13 Drawing Sheets

```
C  initialize excd_time_past on first call to model
C    initial Conditions: excd_time_cur = 9999
                         exced_time_past = 9999 if initialize then
          excd_time_cur = 9999
          excd_time_past = 9999
       endif if (detected_excd .ne. zero) then
          excd_time_past = excd_time_cur
          excd_time_cur = time
1402  { endif if (excd_time_past .ne. 9999 .and. detected_excd .ge. ONE/2 .and.

&  (excd_time_cur - excd_time_past .ge. ONE*1e-6)) then
          freq_cur_next = ONE / (excd_time_cur - excd_time_past) / 2.
       endif
```

```
       if (detected_excd .ne. zero) then
          freq_prev4 = freq_prev3     ~1412
          freq_prev3 = freq_prev2     ~1410
1404  {   freq_prev2 = freq_prev1
          freq_prev1 = freq_cur       ~1408
       endif
                                      1406 sum_excd_limited=MIN(sum_excd, 6.)
       if (sum_excd .gt. ONE) then
1414  {   freq_avg_raw = (freq_prev4+freq_prev3+freq_prev2+freq_prev1
           +freq_cur)/(sum_excd_limited - ONE)
          freq_avg = MIN(freq_avg_raw, 12.)
       endif
```

ACTUATION RESPONSE OSCILLATION DETECTION MONITOR

BACKGROUND INFORMATION

1. Field

The present disclosure relates generally to an improved data processing system and in particular to a method and apparatus for monitoring components. Still more particularly, the present disclosure relates to a method, apparatus, and computer usable program code for monitoring components for a vehicle.

2. Background

Safety and reliability of a system, such as an aircraft, is important when operating a system with a minimal risk of loss. With respect to vehicles, a safe vehicle is a vehicle that can be operated in a manner that mitigates the potential for a loss of human life and/or the vehicle. To avoid these types of situations, a health monitor system is employed to monitor the operation of the vehicle and determine when the vehicle is operating as designed and in a manner that minimizes a potential loss. An example of a health monitor system is an electronic unit that tracks a physical parameter, such as the behavior of a single subsystem or a line replaceable unit within the vehicle. In some cases, sensors may be distributed throughout the vehicle as a network to obtain information about the state of the vehicle.

An aircraft may contain a health monitor system that monitors various subsystems in the aircraft. Current health monitor systems focus on monitoring components in the aircraft to identify component failures or indications that component failures may occur. The monitoring is performed by gathering data from these components or sensors associated with the components. For example, a health monitor system may be implemented for monitoring hydraulic pumps, switches, and motors used in aircraft subsystems. These types of subsystems are typically used to actuate components or systems, such as flight control surfaces, reverse mechanisms, landing gear, and cargo doors.

As an example, an aileron control is a subsystem in an aircraft that controls the position of ailerons. Ailerons are hinged control surfaces attached to the trailing edge of an aircraft wing, and are used to control the bank angle of the aircraft by changing lift on a wing. Determining whether a control system for an aileron has failed or may fail is important for safe operation of the aircraft. Aileron control surface oscillations at certain frequencies and sufficient amplitudes could result in excessive fatigue damage or failure of airplane structure due to body or wing resonance. An oscillation may occur if a component of the control system for the aileron fails or is operating improperly.

One example of this type of failure is that an incorrect positioning command may be sent to the control for the aileron, causing the oscillations. In another example, the mechanical breaking of a feedback wire component within an electro-hydraulic servo actuator could result in an unstable system and uncommanded control surface oscillations. In many applications, if a failure is detected in one control system component, that component may be deactivated and a redundant component may be activated to perform the same function.

Currently, in monitoring electrical and/or digital flight control systems for failures, position sensors are often placed on the electro-hydraulic servo valve spool within a hydraulic servo actuator. This type of monitoring requires an additional sensor and associated wiring from the sensor to the electronics processing the data, because this sensor is not required for operation of the control system. The use of additional sensors and wiring for the sensors increases the cost and weight of an aircraft and reduces the aircraft's reliability.

SUMMARY

The advantageous embodiments provide a method, apparatus, and computer usable program code for monitoring an actuator for a control surface on an aircraft. In one advantageous embodiment, an error signal is generated in response to sending a command to the actuator to move the control surface on the aircraft. Responsive to receiving the error signal, an amplitude and a frequency are identified for the error signal. A determination is made as to whether the amplitude exceeds a set of amplitude limits for the frequency, wherein each amplitude in the set of amplitude limits is associated with a requirement in a set of requirements. An exceedance count is incremented for each requirement in the set of requirements in which an associated amplitude limit has been exceeded to form an updated set of exceedance counts. A fault indication is generated if any exceedance count in the updated set of exceedance counts is greater than a threshold.

In another advantageous embodiment, a method is used to monitor oscillations. An error signal is generated by taking the difference between the command and response of an actuator. A frequency and amplitude are identified for the error signal. A current number of times any amplitude limit has been exceeded by the error signal is identified, wherein the amplitude limit is identified by the frequency of the error signal. A fault indication is generated if the current number of times exceeds a threshold.

In yet another advantageous embodiment, an apparatus comprises an electro-hydraulic actuator and a health monitoring system. The electro-hydraulic actuator is capable of receiving commands to change a position of a control surface to a commanded position. The health monitoring system is capable of receiving data regarding the commanded position and the actual position of the electro-hydraulic actuator, generating an error signal from a difference between the commanded position and the actual position, calculating a frequency and an amplitude for the error signal, comparing the amplitude to a threshold that is selected based on the frequency, and selectively generating a fault indication when the threshold is exceeded.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the present disclosure are set forth in the appended claims. The disclosure itself, however, as well as a preferred mode of use, further objectives and advantages thereof, will best be understood by reference to the following detailed description of an advantageous embodiment of the present disclosure when read in conjunction with the accompanying drawings, wherein:

FIG. 14 is a diagram illustrating code for performing an average frequency function in accordance with an advantageous embodiment.

DETAILED DESCRIPTION

Figure 1:
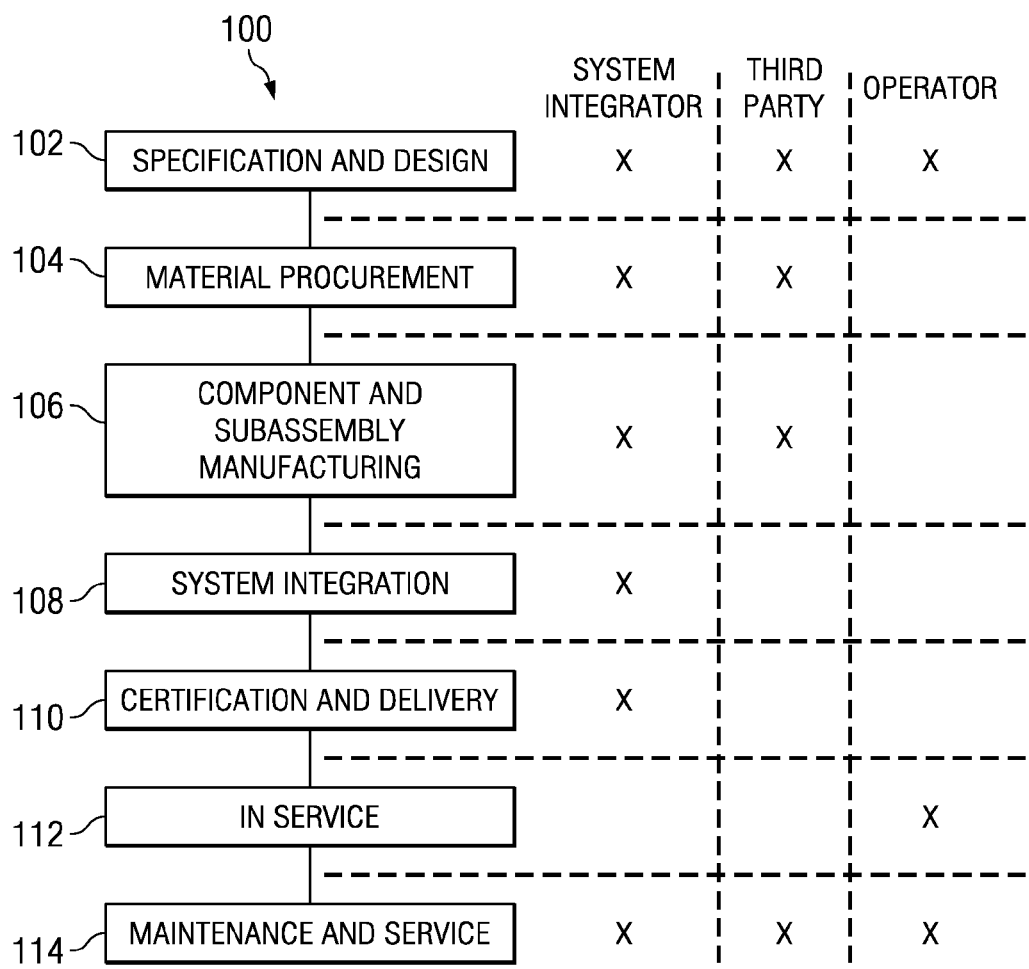
FIG. 1 is a diagram illustrating an aircraft manufacturing and service method in which an advantageous embodiment may be implemented.
Figure 2:
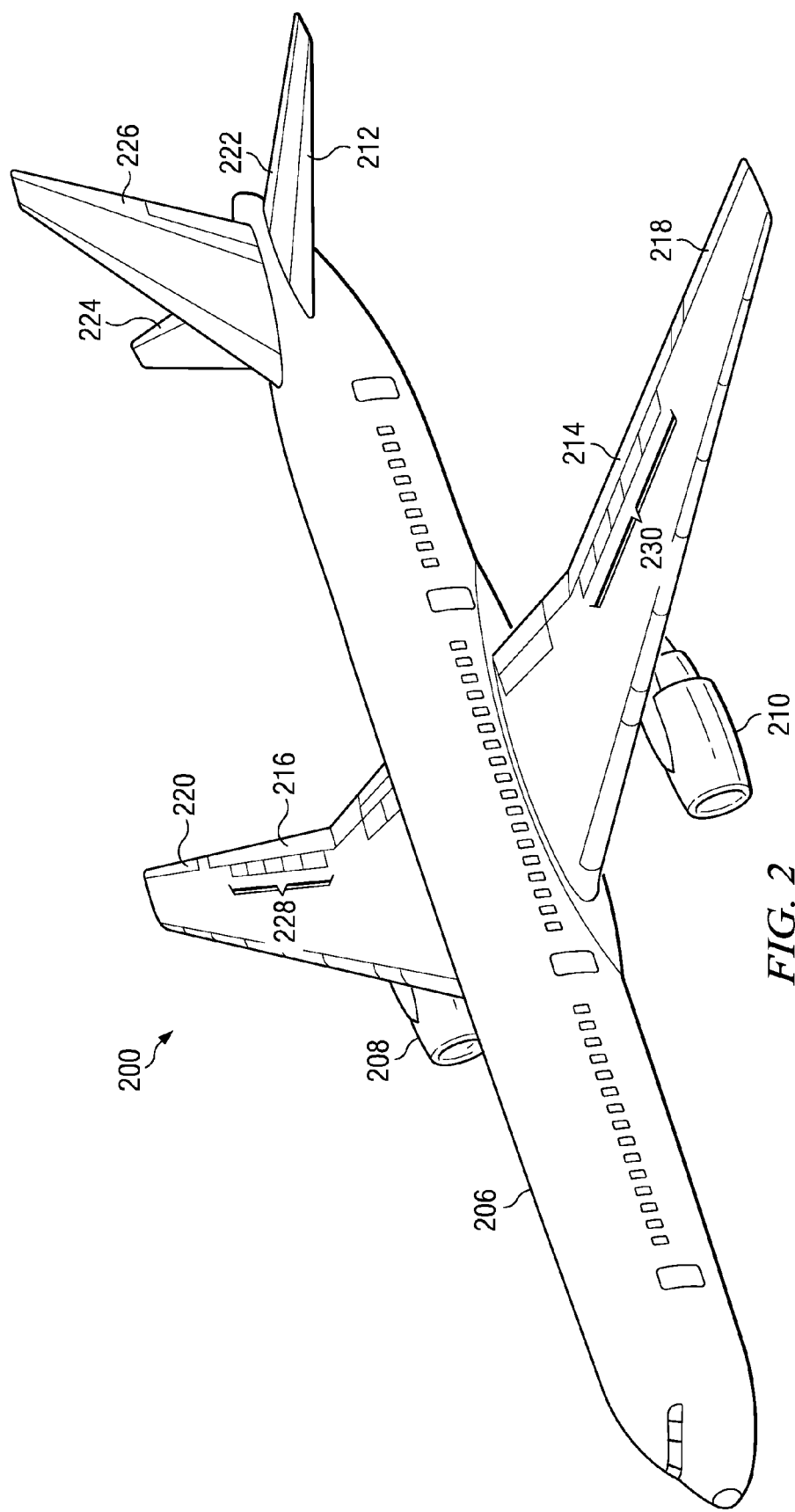
FIG. 2 is a diagram of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator as indicated by the "X" in the grid to the right of the flow diagram of FIG. 1. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 has wings 202 and 204 attached to body 206. Aircraft 200 includes wing mounted engine 208, wing mounted engine 210, and horizontal stabilizer 212. Aircraft 200 also includes ailerons 218 and 220; elevators 222 and 224; rudder 226, or spoilers 228 and 230. Examples of control surfaces are ailerons 218 and 220. Aircraft 200 is produced by aircraft manufacturing and service method 100 in FIG. 1.

Apparatus and methods embodied herein may be employed during any one or more of the stages of production and service method 100 in FIG. 1. For example, components or subassemblies corresponding to component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages for component and subassembly manufacturing 106 and system integration 108 in FIG. 1, for example, by substantially expediting assembly of or reducing the cost of aircraft 200. Similarly, one or more of apparatus embodiments, method embodiments, or a combination thereof may be utilized while aircraft 200 is installing components, such as ailerons 218 and 220; elevators 222 and 224; rudder 226, or spoilers 228 and 230 along with their associated control systems on aircraft 200, which may occur during component and subassembly manufacturing 106 or system integration 108 of aircraft 200 in FIG. 2.

The different advantageous embodiments recognize that the current designs for monitoring flight control systems require the addition of a position sensor on the electro-hydraulic servo valve spool. This valve spool directs high pressure hydraulic fluid to the appropriate actuator piston chamber in order to extend or retract the actuator. The valve spool position provides a clear indication of the status and performance of the actuator. This indication is particularly useful for flight control surfaces with multiple active actuators where the position of the control surface is determined by a summation of force output from the actuators and any surface airloads. The different embodiments also recognize that using this additional sensor for each flight control surface actuator, however, increases the complexity in manufacturing an aircraft because additional sensors and wiring are required to be installed. Further, this increased number of components also adds to the cost and time needed to manufacture an aircraft.

Thus, the different advantageous embodiments include a monitoring system that uses a sensor on the actuator piston, which is already used for closed-loop control of the electro-hydraulic servo actuator. In these examples, the sensor is a pre-existing one already used to determine the position of the actuator piston or moveable component in the actuator. The different advantageous embodiments monitor for oscillations in the operation of the actuator to determine whether a failure of the control system or actuator has occurred.

In one advantageous embodiment, an error signal is generated by taking the difference between the command to the actuator and the response measured by the position sensor on the actuator piston. The frequency and amplitude is identified for the error signal. The current number of times any amplitude limit has been exceeded by the amplitude for the error signal is identified. An amplitude limit is identified by the frequency of the error signal. A fault is generated if the current number of times exceeds a threshold. This fault indication may be used to perform a corrective action, such as ceasing use of the actuator. Another corrective action may be to use another actuator or control system to control the control surface on the aircraft.

More specifically, in another advantageous embodiment, a method may be employed to monitor an actuator for a control surface on an aircraft. The process receives an error signal generated in response to sending a command to the actuator to move the control surface on the aircraft. In response to receiving the error signal, an identification of the amplitude and a frequency is made for the error signal. A determination is made as to whether the amplitude exceeds a set of amplitude limits for the frequency. This set of amplitude limits may be one or more limits, depending on the particular implementation and the nature of the requirements levied upon the control system. Each amplitude limit, in the set of amplitude limits, is associated with a requirement in the set of requirements.

The set of requirements is one or more requirements. Each requirement defines an amplitude limit for different frequencies of oscillation by a control surface. The requirement also defines the number of times an amplitude limit can be exceeded before a fault should be set. An exceedance count is incremented for each requirement in the set of requirements in which an associated amplitude limit has been exceeded by the amplitude to form an updated set of exceedance counts.

A fault is set if any exceedance count, in the updated set of exceedance counts, is greater than a threshold. In these examples, the threshold is a limit to a number of oscillation cycles at the given amplitude before a fault is set. This fault may be used to disable the failed control system, and/or serve as a warning to flight or maintenance crews of a problem or potential problem. One example is a failed state or that the control surface operation may be in danger of causing damage to the aircraft structure. In these illustrative examples, a requirement identifies acceptable or maximum amplitudes that may occur for different frequencies before a fault is set. The requirements are used to identify the amplitude limit and the threshold for the number of times an amplitude limit can be exceeded in these examples With reference now to FIG. 3, a diagram illustrating components used, within an electronic or digital flight control system, in moving a control surface is depicted in accordance with an advantageous embodiment. In this example, the components include pilot controls 300, electronic controller 302, flight control actuator 304, position sensor 306, and control surface 308.

In this example, pilot controls 300 may be manipulated by a pilot to generate pilot control sensor input data 310, which is received by electronic controller 302. In response to receiving pilot control sensor input data 310, electronic controller 302 generates command 312 and sends this command to flight control actuator 304. In this example, command 312 contains a signal commanding the actuator to extend or retract at the commanded rate. Position sensor 306 measures the actuator piston position and provides this data to the electronic controller 302 for loop closure. The commanded position is the desired position for flight control actuator 304 to move control surface 308 to the desired position.

Flight control actuator 304 is an electro-hydraulic actuator, which is capable of responding to electrical commands to extend or retract the piston at the desired rate to change a position of control surface 308. More specifically, flight control actuator 304 changes a position of actuator piston 313 to move or reposition control surface 308 to a desired position. In other words, the commanded position identifying the position of actuator piston 313 translates into the desired position for control surface 308. The motion of the actuator piston 313 is caused by high pressure hydraulic fluid supplied by the aircraft hydraulic system to flight control actuator 304, which is activated in response to electrical signals, such as command 312.

In the depicted example, electronic controller 302 may contain the hardware and software needed to control multiple different systems and subsystems within an aircraft. Further, electronic controller 302 may include hardware and software for providing a health monitor and other control functions in an aircraft.

In response to receiving command 312, flight control actuator 304 moves actuator piston 313 along directions of line 314. Control surface 308 moves in the directions along line 316 in response to movement of actuator piston 313 by flight control actuator 304 along line 314. The movement of control surface 308, while the aircraft is in flight, causes air to move over control surface 308 differently. Force or pressure is exerted on surface 318 of control surface 308 as air passes over surface 318.

Oscillations of control surface 308 may occur, for example, if the actuator is not operating properly. Another non-limiting example is incorrect commands being sent by electronic controller 302 to flight control actuator 304 that cause oscillations. If the amplitude of the oscillations are more than some threshold level at the frequency of the oscillations, damage or failure of the structure of aircraft 200 on FIG. 2 may occur.

The movement of actuator shaft 313 in flight control actuator 304 is detected by position sensor 306, which identifies the position of flight control actuator 304 in response to command 312. This position is returned as position feedback 318 to electronic controller 302. In these examples, position feedback data 318 supplied by position sensor 306 is used by electronic controller 302 to maintain closed-loop control of the actuator.

Information from this sensor also is used in the different advantageous embodiments to determine whether detected oscillations indicate that flight control actuator 304 is operating abnormally. The abnormal operation may be from a failure or potential failure of flight control actuator 304. Alternatively, the abnormal operation may be due to a problem with electronic controller 302. In either case, the oscillations of control surface 308 should be halted to prevent damage and/or failure of control surface 308 or the airplane global structure due to airplane body or wing resonance.

In the depicted examples, the commanded position generated by electronic controller 302 may be compared to the actual position of actuator shaft 313 in flight control actuator 304 in position feedback 318 to determine the error or difference between the two. This error information may be used to identify oscillations and amplitude of oscillations. The identified information may be used to determine the failure state of flight control actuator 304. This state may be, for example, operating properly or failed.

More specifically, this identified information may be used to detect oscillatory failures. The difference between the actual position of actuator piston 313 and the commanded position may change to indicate that oscillations are occurring in control surface 308. The amount of the difference may be used to identify the amplitude of the oscillation. In other words, if uncommanded oscillations in control surface 308 occur, actuator piston 313 will be in a different position than the commanded position.

As the difference between the positions becomes larger, the amplitude becomes larger. The different illustrative embodiments provide a capability to detect these oscillations and detect when the oscillations are at an amplitude where corrective action may be required. The corrective action may be to cease using control surface 308 or use a backup actuator and/or electronic controller to control this component.

Figure 3:
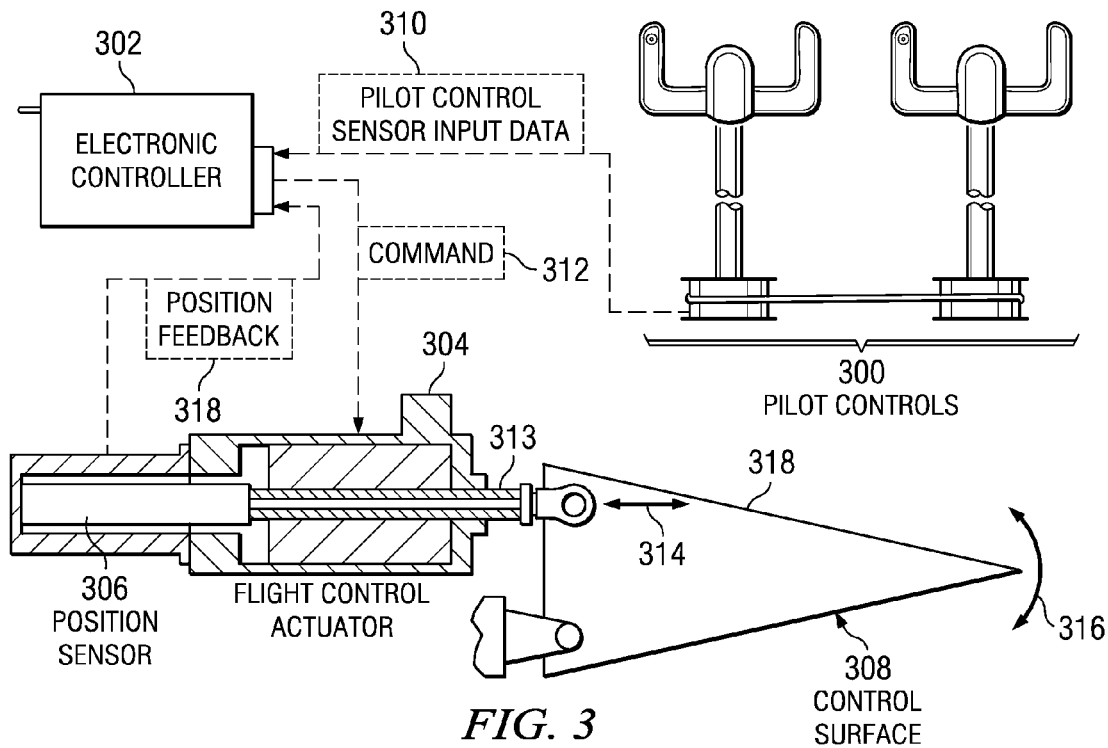
FIG. 3 is a diagram illustrating components in a fly-by-wire system used in moving a control surface in accordance with an advantageous embodiment.
Figure 4:
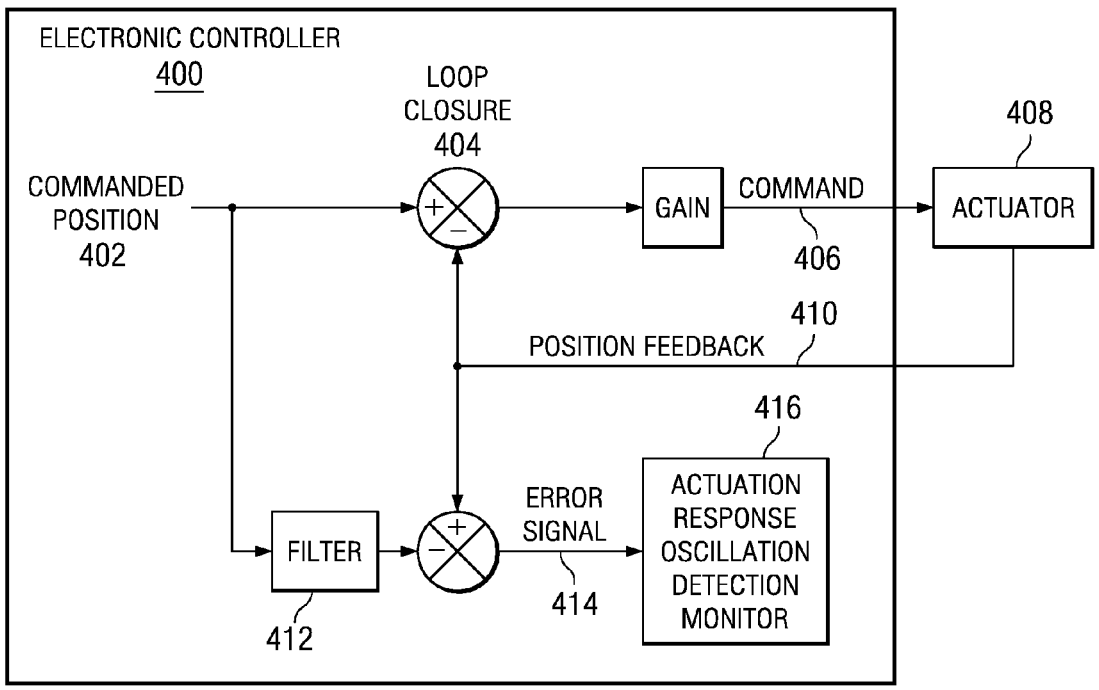
FIG. 4 is a diagram of actuator loop closure in accordance with an advantageous embodiment.

Turning now to FIG. 4, a diagram of actuator loop closure is depicted in accordance with an advantageous embodiment. In these examples, actuator loop closure may be used to provide closed loop control of an actuator. In this illustrative example, electronic loop closure is provided by electronic controller 400, which is equivalent to electronic controller 302 in FIG. 3. Using input data provided by sensors and other airplane systems, electronic controller 400 generates commanded position 402, which is the intended position of actuator 408. In this example, actuator 408 is equivalent to flight control actuator 313 in FIG. 3. The difference between commanded position 402 and actuator position feedback 410 provides the output of loop closure 404. The output of loop closure 404 is multiplied by a gain and is then transmitted as a rate command to actuator 408. Therefore, the magnitude of command 406 is proportional to the difference between commanded position 402 and the position feedback 410.

In this example, commanded position 402 is filtered and subtracted from position feedback 410 to generated error signal 414, which is used as the input to actuation response oscillation detection monitor 416. In this example, filter 412 models the dynamics of actuator 408.

Figure 5:
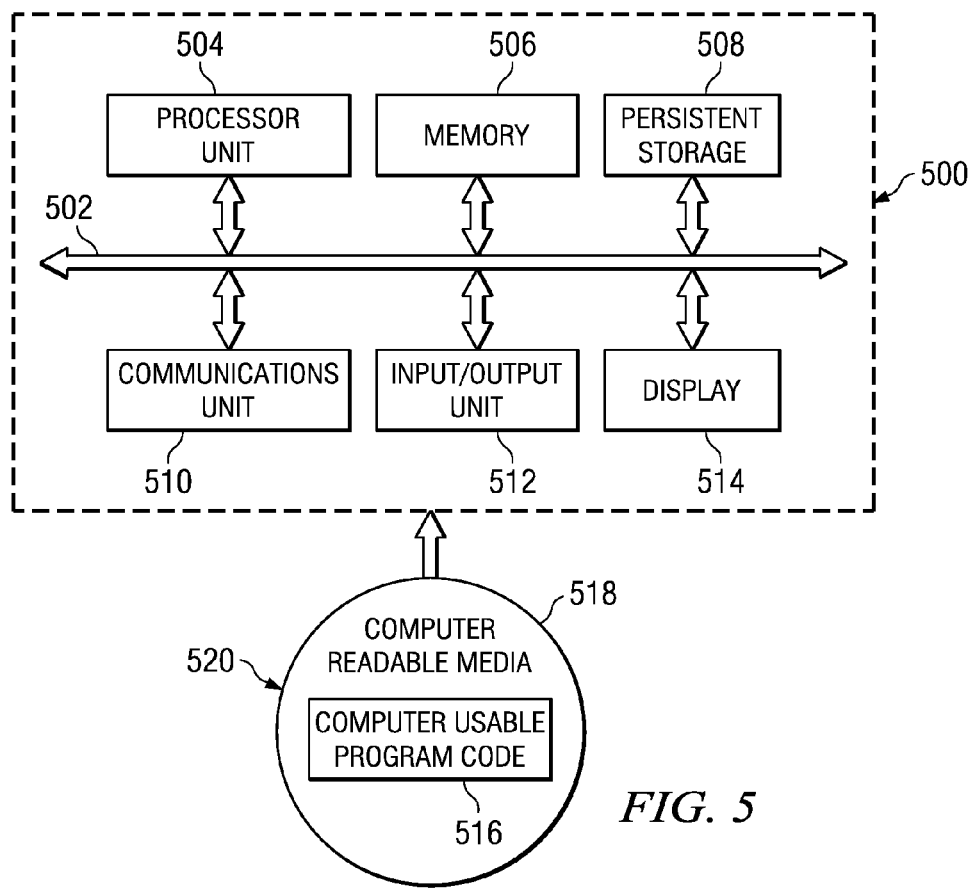
FIG. 5 is a diagram of a data processing system in accordance with an advantageous embodiment.

Turning now to FIG. 5, a diagram of a data processing system is depicted in accordance with an advantageous embodiment. Data processing system 500 is a block diagram illustrating components that may be found in an aircraft to provide health monitor system and control system functions. In these examples, data processing system 500 may be used to implement electronic controller 302 in FIG. 3.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multiprocessor core, depending on the particular implementation. Further, processor unit 504 may be implemented using one or more heterogeneous processor systems in which a main processor is present with secondary processors on a single chip. As another illustrative example, processor unit 504 may be a symmetric multiprocessor system containing multiple processors of the same type.

Memory 506, in these examples, may be, for example, a random access memory. Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as computer usable program code or computer readable program code that may be read and executed by a processor in processor unit 504.

The computer readable program code may be embodied on different physical or tangible computer readable media, such as memory 506 or persistent storage 508.

Computer usable program code 516 is located in a functional form on computer readable media 518 and may be loaded onto or transferred to data processing system 500. Computer usable program code 516 and computer readable media 518 form computer program product 520 in these examples. In one example, computer readable media 518 may be in a tangible form, such as, for example, an optical or magnetic disc that is inserted or placed into a drive or other device to that is part of persistent storage 508 for transfer onto a storage device, such as a hard drive that is part of persistent storage 508. In a tangible form, computer readable media 518 also may take the form of a persistent storage, such as a hard drive or a flash memory that is connected to data processing system 500.

Alternatively, computer usable program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also make take the form of non-tangible media, such as communications links or wireless transmission containing the computer readable program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

For example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
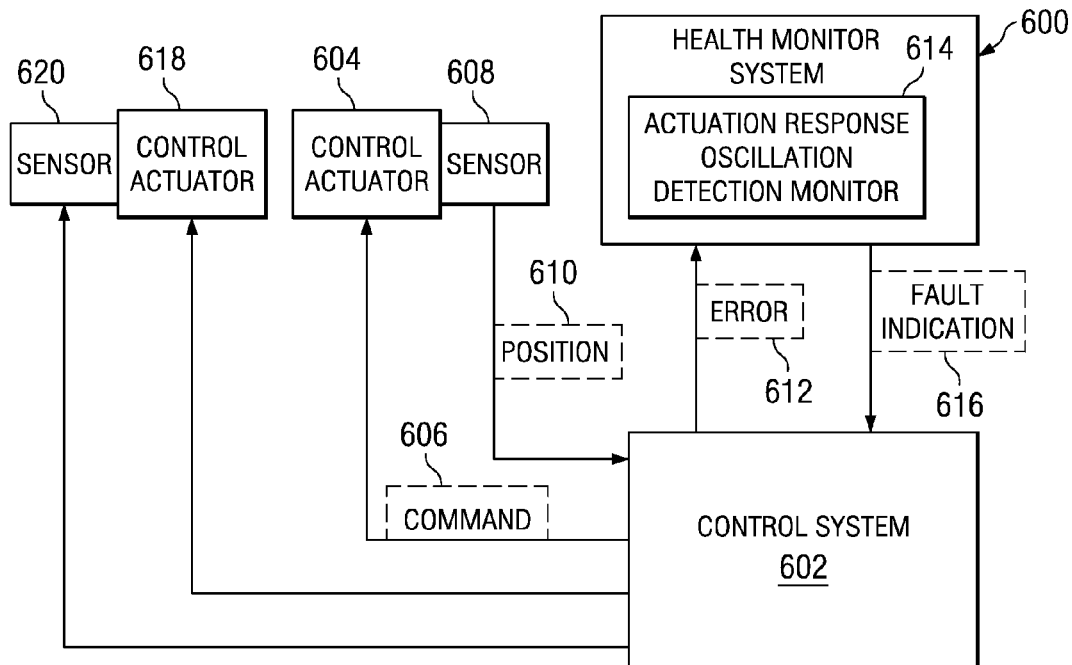
FIG. 6 is a diagram illustrating components used to monitor and control a control actuator in accordance with an advantageous embodiment.

Turning now to FIG. 6, a diagram illustrating components used to monitor and control a control actuator is depicted in accordance with an advantageous embodiment. In this example, health monitor system 600 operates in conjunction with control system 602 to determine whether control actuator 604 is operating properly. Health monitor system 600 and control system 602 are examples of components that may be implemented in electronic controller 302 in FIG. 3 using data processing system 500 in FIG. 5.

Control actuator 604 may be implemented using flight control actuator 304 in FIG. 3, in these examples. Control system 602 sends command 606 to change the position of control actuator 604. Command 606 identifies a rate for control actuator 604 to change the commanded position. The rate in command 606 is generated by control system 602 in order to achieve the intended position for control actuator 604. In these examples, the intended position is the position of the actuator piston that is connected to a control surface, such as an aileron. This intended position is also referred to as the "commanded position", in these examples.

Sensor 608 detects the actual position of control actuator 604 and returns position 610 to control system 602. The commanded position for command 606 is filtered within the control system 602 to provide an expected actual position response. The difference between the filtered commanded position and the actual position in position 610 is sent to health monitor system 600 as error 612. Depending on the particular implementation, error 612 may be a filtered error signal. This filtering may be used to eliminate noise that occurs because of differences that are less than some threshold.

Health monitor system 600 uses error 612, along with other information received from control system 602, to identify a failure state of control actuator 604. In particular, health monitor system 600 uses error 612, along with a history of other errors received from sensor 608, to determine whether control actuator 604 is operating properly or if the conditions are such that the control surface controlled by control actuator 604 is oscillating in a manner that should be halted. Depending on the particular implementation, multiple states may be identified for a control surface connected to control actuator 604.

In these examples, the control actuator is considered to be in an operating state, a failed state, or a failing state. Depending on the particular implementation, health monitor system 600 may only identify a failed state and an operating state for control actuator 604. Actuation response oscillation detection monitor 614 in health monitor system 600 processes error signals, such as error 612, to determine a state of actuator 604. In particular, actuation response oscillation detection monitor 614 identifies a frequency and amplitude for error 612.

If actuation response oscillation detection monitor 614 identifies oscillations on the control surface at amplitudes greater than an amplitude threshold for the frequency at which the oscillation is occurring in which the oscillations occur more than some period of time or more than some number of occurrences, actuation response oscillation detection monitor 614 generates fault indication 616, which is sent to control system 602.

In response to receiving this indication, control system 602 may use an alternate or redundant control actuator, such as control actuator 618 to control or move the control surface. Alternatively, control actuator 618 may be disabled along with the use of the associated control surface. In a similar fashion, control actuator 618 includes sensor 620, which provides data in a similar fashion to sensor 608. In this manner, an identification of a failed state in control actuator 604 may be used to initiate control of the control surface with a backup control actuator, such as control actuator 618.

In these examples, health monitor system 600 uses actuation response oscillation detection monitor 614 to identify whether control actuator 604 is in a working state or a failed state. In other advantageous embodiments, actuation response oscillation detection monitor 614 may include processes to identify when oscillations in the control surface indicate a corrective action is needed. This information may be used to generate a fault indication similar to fault indication 616 in which the fault indication indicates that a failure may occur. This type of indicator may be used to replace or repair control actuator 604 during maintenance before a failure actually occurs.

Figure 7:
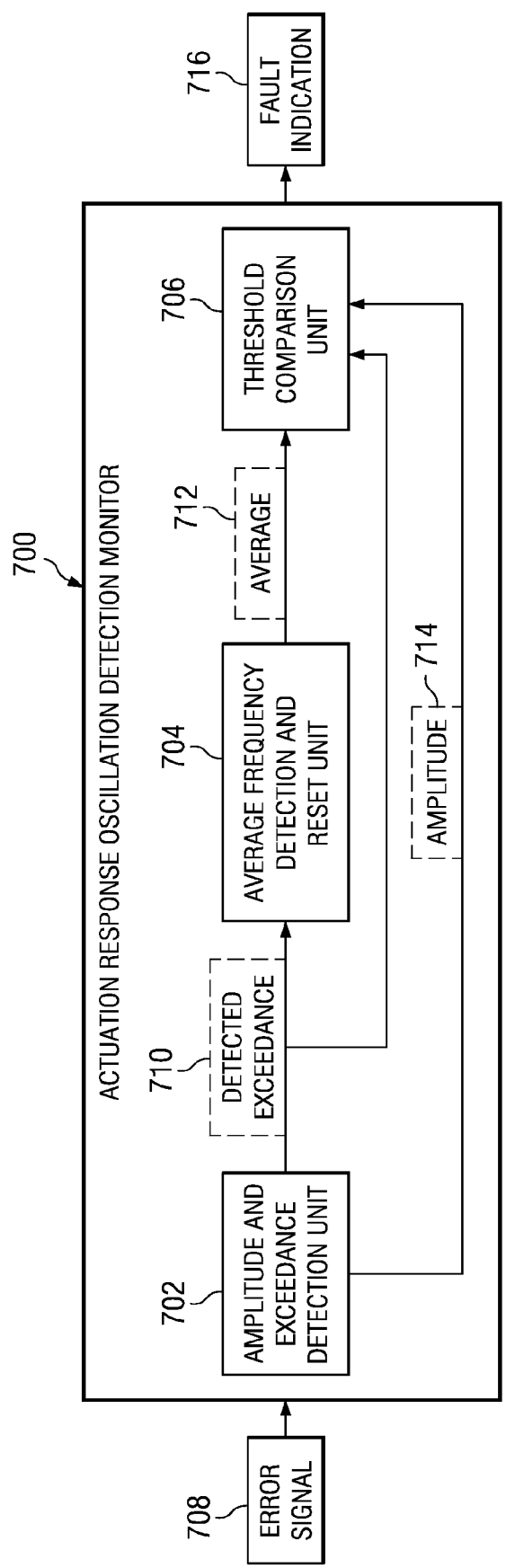
FIG. 7 is a diagram illustrating components used to monitor error signals from a control actuator in accordance with an advantageous embodiment.

Turning now to FIG. 7, a diagram illustrating components used to monitor error signals from a control actuator is depicted in accordance with an advantageous embodiment. In this example, actuation response oscillation detection monitor 700 is a more detailed illustration of components that may be used to implement actuation response oscillation detection monitor 614 in FIG. 6. In these examples, actuation response oscillation detection monitor 700 includes three functional components, amplitude and exceedance detection unit 702, average frequency detection and reset unit 704, and threshold comparison unit 706.

Amplitude and exceedance detection unit 702 receives error signal 708 and identifies the maximum amplitude of error signals that have been received. In other words, amplitude and exceedance detection unit 702 compares error signal 708 with the highest or greatest amplitude for a prior error signal received by actuation response oscillation detection monitor 700. If error signal 708 is greater than the previous amplitude, this new amplitude is stored. A similar comparison is made to find the minimum value for error signals, such as error signal 708.

Further, when the magnitude of an error signal identified by amplitude and exceedance detection unit 702 exceeds some maximum value or some minimum value, a signal, such as detected exceedance 710, is sent to average frequency detection and reset unit 704. In these examples, detected exceedance 710 is an integer indicating an event that occurred that should be processed. In these examples, the maximum and minimum values for generating detected exceedance 710 are used as a noise filter to prevent sending every error signal that is received for processing.

Average frequency detection and reset unit 704 calculates average 712 from detected exceedance 710 and other previous exceedances in previous detected exceedance signals.

Average 712 is used by threshold comparison unit 706 to determine whether the average frequency is greater than some frequency threshold. The average frequency is the frequency at which the control surface is oscillating, in these examples.

If the average frequency is greater than the frequency threshold, the frequency signal in average 712 is used to lookup and establish the maximum allowable amplitude for the detected frequency. This maximum allowable threshold is compared to amplitude 714 from amplitude and exceedance detection unit 702. Amplitude 714 is the difference between the last maximum (positive) amplitude and the last minimum (negative) amplitude detected by amplitude and exceedance detection unit 702. Threshold comparison unit 706 uses this information to identify the peak-to-peak amplitude that is compared to the maximum allowable threshold. This comparison information is used to determine whether the amplitude exceeds the threshold amplitude for the calculated average frequency.

If the amplitude exceeds the threshold, then a determination is made as to whether the number of times the threshold has been exceeded is greater than some default value. If the number of times that the recorded cycles is greater than the default, threshold comparison unit 706 generates control system fault 716. In these examples, the maximum amplitude for a frequency and the threshold for the number of times a maximum amplitude has been exceeded may be set using requirements that may originate from government regulations or from safety testing and/or simulations of the control surface and the effect of control surface motion on aircraft structure and dynamic loads.

When the number of times that the recorded cycles exceed a maximum amplitude threshold is greater than some predetermined value, threshold comparison unit 706 assumes that the control actuator has failed, in these examples. The different functional units shown in actuation response oscillation detection monitor 700 are presented for purposes of illustrating different functions and are not meant to imply architectural limitations on the manner in which these functions may be implemented. For example, different functions may be provided for in different units or all of the units may be combined to provide functionality in a single hardware, software, or hardware and software system.

Figure 8:
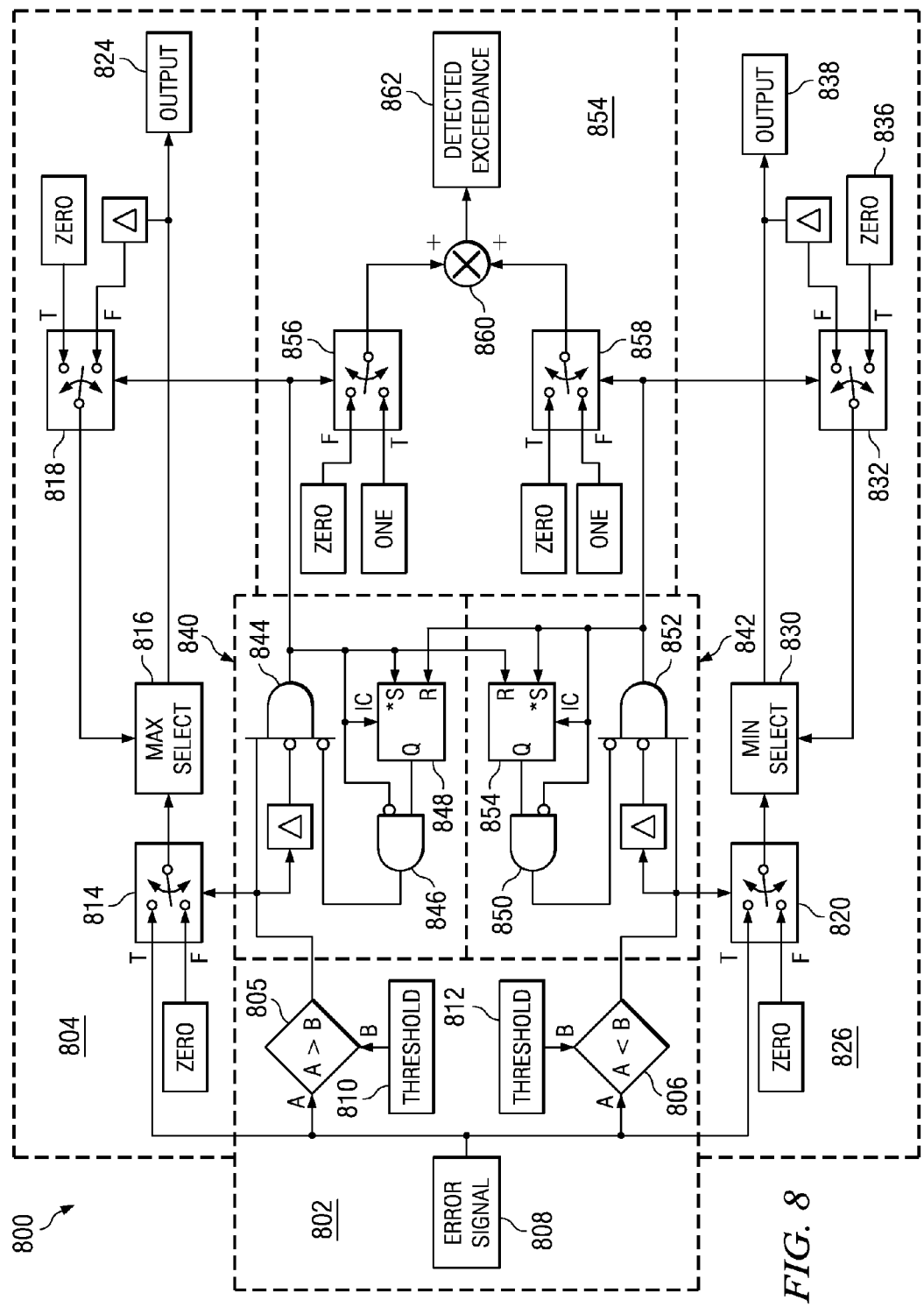
FIG. 8 is a diagram illustrating an amplitude and exceedance detection unit in accordance with an advantageous embodiment.

Turning now to FIG. 8, a diagram illustrating an amplitude and exceedance detection unit is depicted in accordance with an advantageous embodiment. In this example, amplitude and exceedance detection unit 800 is a more detailed example of amplitude and exceedance detection unit 702 in FIG. 7. Section 802 in amplitude and exceedance detection unit 800 includes comparator 805 and comparator 806. These comparators compare error signal 808 with threshold 810 and threshold 812.

Error signal 808 is a difference between the position command and the actuator response for a control actuator as measured by a position sensor. The position command contains a command to change the position of the actuator piston to the commanded position. The actuator is controlled to the commanded position by transmitting an appropriate rate command electronically to the control actuator. The input command defines a commanded position for the actuator, and the response is the actual position.

In these examples, error signal 808 is a filtered error signal. Filtering may be performed to reduce noise or to eliminate steady-state errors by attenuating low frequency content. Additionally, in these examples, the commanded position may be modified by adding filtering or lag when generating error signal 808 to account for the delays between the actuator receiving the command and responding to the command.

Threshold 810 provides a positive threshold, while threshold 812 provides a negative threshold. If error signal 808 is greater than threshold 810 or less than threshold 812, an output is generated by either comparator 805 or comparator 806 indicating that threshold 810 or threshold 812 has been exceeded by error signal 808. The thresholds are used to filter out amplitudes in error signal 808 that do not exceed some upper level or some lower lever. In other words, section 802 serves to filter out signals of sufficiently low amplitude that they are considered noise signals and would therefore not be of concern to airplane structure.

Section 804 also receives error signal 808 and identifies a maximum value or amplitude for error signal 808. Section 804 includes switch 814, maximum select 816, and switch 818. Switches, such as switch 814 and switch 818 are used to select between two different values, in these examples. Each switch has two inputs that may be transmitted through the output of the switch based on a third input used to select which input should be used.

An integer value of zero is one input into switch 814 and switch 818. The second input into switch 814 is error signal 808, and the second input into switch 818 is the output of maximum select 816. Comparator 805 controls the state of switch 814, while AND gate 844 controls the state of switch 818.

Maximum select 816 is used to select between the current error signal value in error signal 808 and the previous selected maximum error signal, which is maintained through use of a last computational frame within the signal flow loop. A computational frame is a period or cycle during which operations or computations occur for a selected input. When error signal 808 exceeds threshold 810, the output of comparator 805 sets switch 814 to pass error signal 808 to maximum select 816. Switch 818 allows the previous selected maximum error signal to be reset to zero when error signal 808 registers a new positive error threshold per comparator 805 and AND gate 844. The output of section 804 is output 824, which is the maximum amplitude that has been detected for error signal 808 during the current oscillatory cycle of error signal 808.

In a similar fashion, section 826 contains switch 820, minimum select 830, and switch 832 to identify the minimum amplitude that has been detected in error signal 808. A logic-indicating zero is one of the inputs into switch 820 and switch 832. The other input into switch 820 is error signal 808. The other input into switch 832 is the output of minimum select 830. In this example, switch 820 is controlled by the output of comparator 806, while switch 832 is controlled by the output of AND gate 852. An integer zero is sent to minimum select 830 when section 826 is to be reset.

When error signal 808 is less than the threshold, the value of error signal 808 is passed through switch 820 by comparator 806 to pass this value to minimum select 830. Because threshold 812 is a negative number, error signal 808 is passed through switch 820 when error signal 808 is a large negative number. Switch 832 is used to return the greatest current minimum value for error signal 808 to minimum select 830. Section 826 may be reset by sending value 836, which is an integer zero, in these examples, as the output of switch 832. The output of section 826 is output 838, which is the minimum value for error signal 808 during the current oscillatory cycle of error signal 808.

Section 840 and section 842 are used to count exceedances of error signal 808 as identified by comparators 805 and 806. These sections are used to ensure that only one exceedance is generated per oscillation cycle of error signal 808. In other words, sections 840 and 842 are used to prevent an exceedance from being counted more than once. In these examples, section 840 includes AND gate 844, AND gate 846, and latch 848. Section 842 includes AND gate 850, AND gate 852, and latch 854.

A value of true is generated by section 840 if (1) comparator 805 generates a true signal, (2) comparator 805 did not have a true signal in the previous computational frame or sample, and (3) the switch state of switch 814 has been reset. A switch state transmits a value of true when the "set" input has been set to true, and maintains the output until the "reset" input has been set to true. The switch state is set whenever a detected exceedance is registered, in these examples. The switch state is reset when the last detected exceedance was in the opposite direction or as an initial condition, such as a power up. This switch in the state ensures that only one count is registered per positive or negative exceedance during an error signal oscillation. Section 842 performs a similar function except that negative detected exceedances are counted by section 842.

Section 854 includes switch 856 and switch 858. The two inputs into switch 856 are an integer value of zero, and an integer value of one. AND gate 844 controls the output of switch 856 and causes switch 856 to output an integer value of one if an exceedance is detected in section 802. In a similar fashion, switch 858 receives integer values of one or zero as inputs. The input selected as an output by switch 858 is controlled by AND gate 852. This gate causes switch 858 to output an integer value of one, when an exceedance of a lower threshold is detected in section 802.

Summing node 860 is used to sum the values output by switch 856 and switch 858. In these examples, both switches 856 and 858 do not output an integer value of one at the same time because only one of the thresholds can be exceeded in section 802 for any single computational frame.

The output of section 854 is detected exceedance 862, This section maintains an integer value of zero or one. Detected exceedance 862 has a value that is integer one whenever the logic from section 840 or section 842 is a one. In these examples, each section only maintains an integer value of one for a single computational frame for a single oscillation cycle of error signal 808. For example, one positive followed by one negative detected exceedance. Otherwise, the value of detected exceedance 862 is an integer zero.

Figure 9:
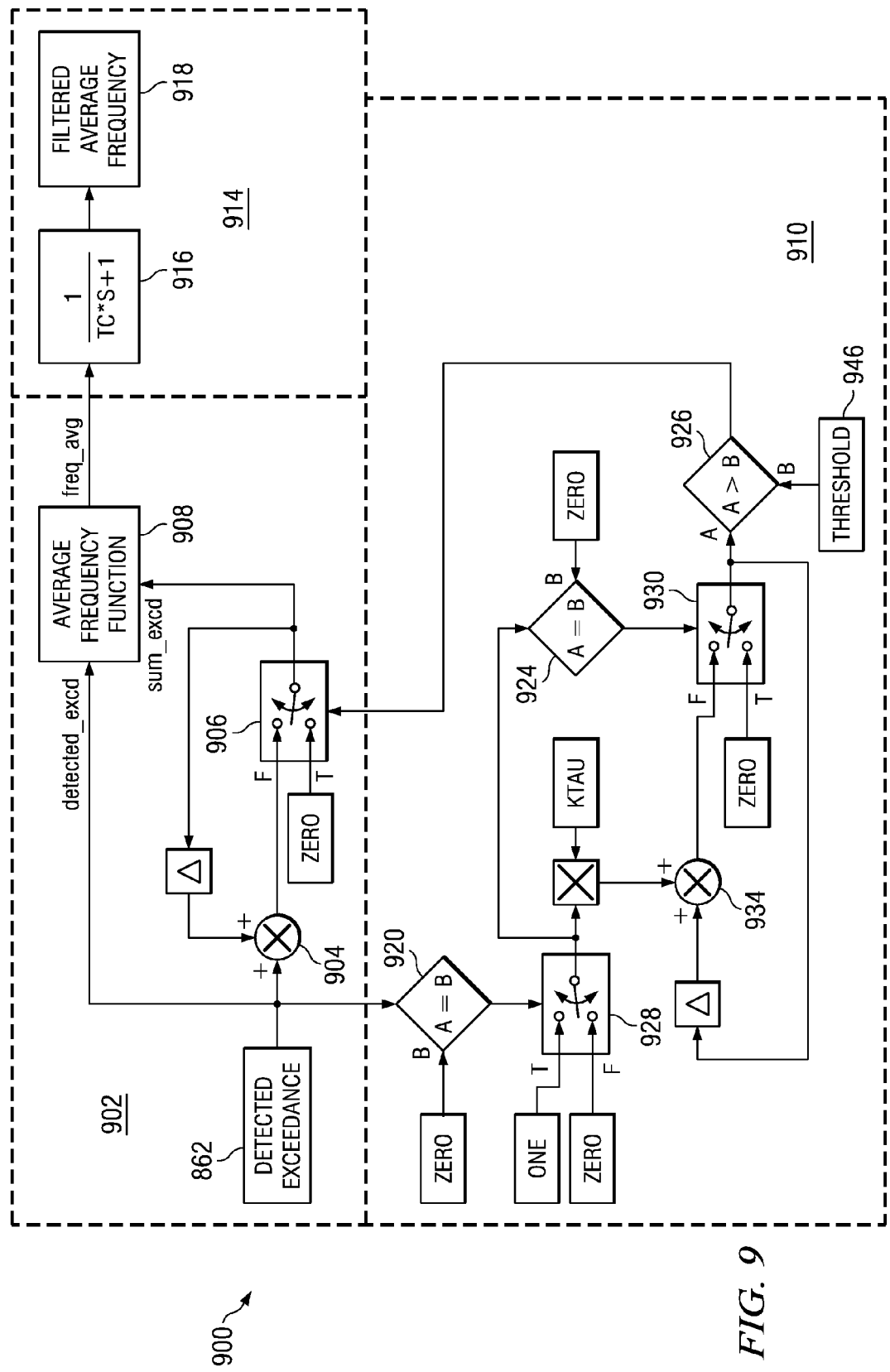
FIG. 9 is a diagram of an average frequency detection and reset unit in accordance with an advantageous embodiment.

Turning now to FIG. 9, a diagram of an average frequency detection and reset unit is depicted in accordance with an advantageous embodiment. In this example, average frequency detection and reset unit 900 is a more detailed illustration of average frequency detection and reset unit 704 in FIG. 7.

Section 902, in average frequency detection and reset unit 900, contains summing node 904, switch 906 and average frequency function 908. The input into section 902 is detected exceedance 862 from section 854 in amplitude and exceedance detection unit 800 in FIG. 8. The output of summing node 904 creates a current count of the number of consecutive detected exceedances.

In other words, section 902 keeps count of how many consecutive exceedances have been detected. Switch 906 has an integer zero as one input and the other input is connected to the output of summing node 904. Summing node 904 has an input connected to the output of switch 906 and the second input that receives detected exceedance 862 in FIG. 8. The output or current count of consecutive exceedances is summed or added to detected exceedance 862.

Thus, when detected exceedance 762 is an integer value of one, summing node 904 increments the count of detected exceedances and inputs that result into switch 906. When detected exceedance 862 is a logic zero, the current count of detected exceedances does not change. The output of switch 906 from the previous computational frame is fed back to summing node 904 such that this value is added or summed with any detected exceedances that are applied or sent to summing node 904.

In this manner, switch 906, in this configuration with summing node 904, acts as a counter. Switch 906 may be reset by applying an integer value of zero, in these examples. Switch 906 is set to output an integer value of zero in response to a signal from section 910 as described below.

Average frequency function 908 uses the sum of all the consecutive detected exceedances and detected exceedance 862 and processes these values with a average frequency function to generate an average frequency as an output of average frequency function 908.

Section 914 contains filter 916, which filters the output of average frequency function 908 to avoid rapid fluctuations in frequency signal. In these examples, filter 916 is a first order lag filter. The output of filter 916 is a filtered average frequency 918.

Section 910 is used to reset the total count of the detected exceedances in switch 908. This section contains two loops to control the reset of the average frequency function in section 902. If a specified amount of time has passed without receiving a detected exceedance, such as detected exceedance 862, section 910 resets the running sum stored in switch 906 for average frequency function 908. This reset function in section 910 ensures that the output of the averaging function only considers consecutive oscillations and does not calculate an erroneously low average frequency if oscillations do not occur for an extended period of time.

Section 910 includes comparators 920, 924, and 926. Further, section 910 also includes switches 928 and 930. Summing node 934 is also present in section 910. Comparator 920 receives an integer value of zero as one input for comparison and the value for detected exceedance 862 as another input. If a detected exceedance is not present, meaning an integer value of zero is the value for detected exceedance 862, then comparator 920 changes the state of switch 928. The inputs of switch 928 are integer values of one and zero in this example. Therefore, switch 928 outputs an integer value of one for every computational frame in which detected exceedance 862 was not registered. The output of switch 828 is then multiplied by the computational frame time increment, ktau, in multiplier 990.

These time increments are then counted by summing node 934 to determine the total time elapsed since the value of detected exceedance 862 was integer one. Comparator 924 receives the output of switch 928 as one input and a logic zero as another input to determine whether both inputs are integer zeros. If both inputs are integer zero, then comparator 924 changes the state of switch 930. This operation resets the time increment counter to summing node 934. Switch 930 has the output of summing node 934 as one input and a logic zero as another input.

Comparator 926 compares the output of switch 930 with threshold 946. If the output of switch 930 is greater than threshold 946, then comparator 926 changes the state of switch 906. If the output of switch 930 is greater than threshold 946, then the consecutive detected exceedance counter in switch 906 is reset, to indicate that subsequent detected exceedances should not be considered consecutive exceedances in the average frequency function calculator 908.

Figure 10A:
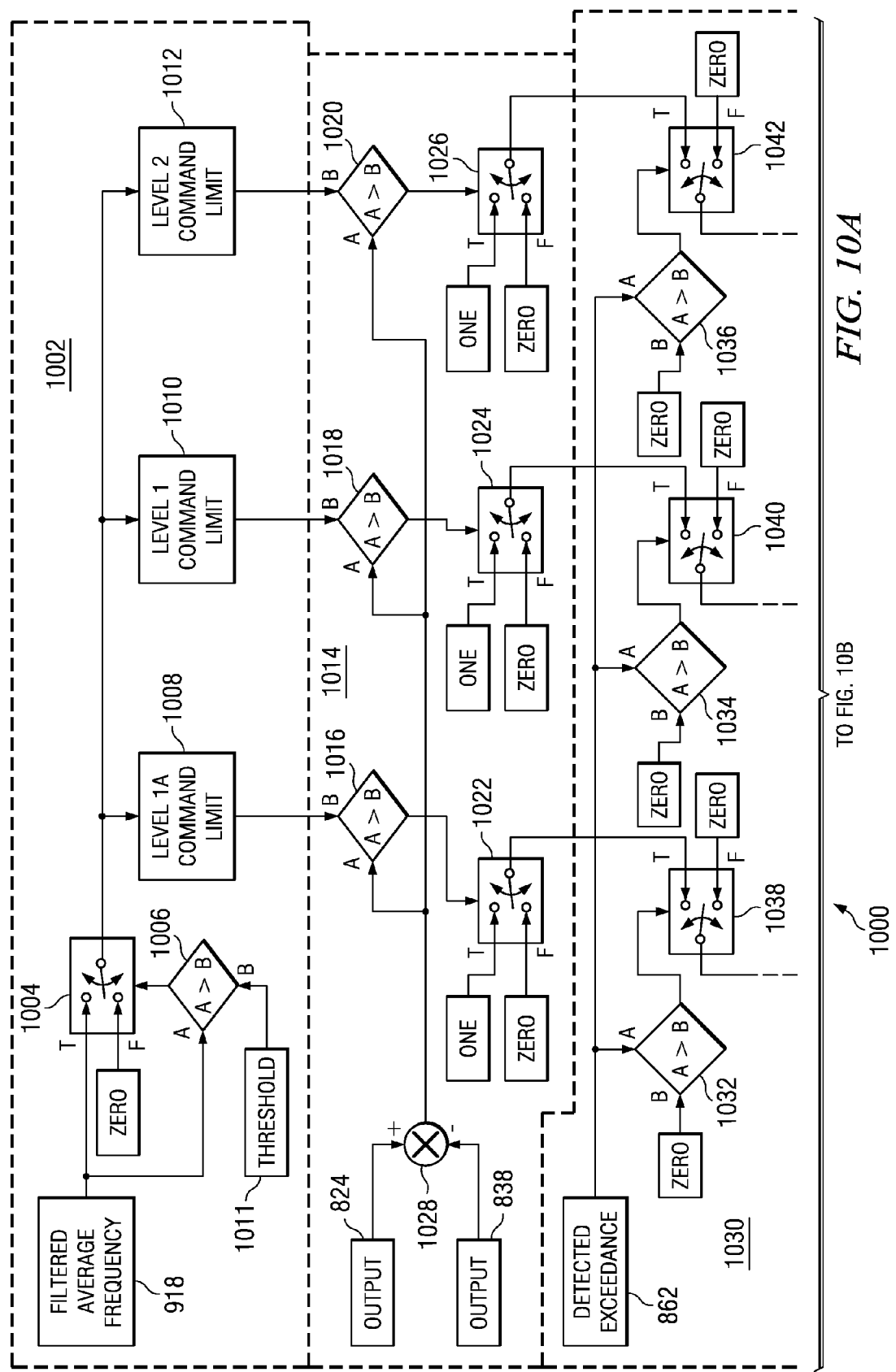
FIGS. 10A and 10B are a diagram of a threshold comparison unit in accordance with an advantageous embodiment.
Figure 10B:
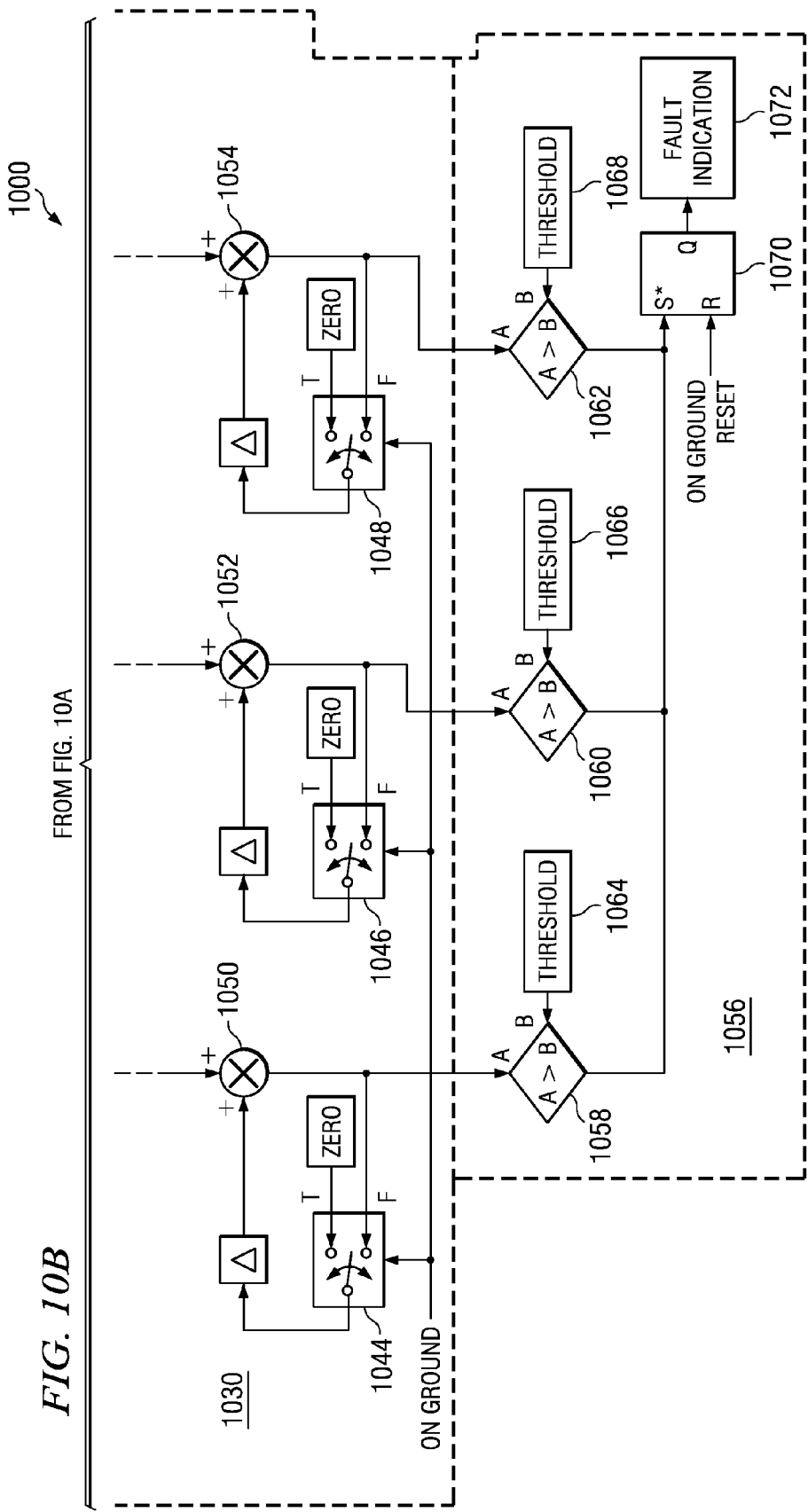

Turning now to FIGS. 10A and 10B, a diagram of a threshold comparison unit is depicted in accordance with an advantageous embodiment. In this example, threshold comparison unit 1000 is a more detailed example of threshold comparison unit 706 in FIG. 7. Section 1002 in threshold comparison unit 1000 performs a threshold lookup function and includes switch 1004, comparator 1006 and lookup tables 1008, 1010, and 1012.

Switch 1004 has filtered average frequency 918 as one input and integer zero as a second input. An integer zero is output from switch 1004 until filtered average frequency 918 is greater than a threshold. This determination is made by comparator 1006, which compares the value of filtered average frequency 918 with threshold 1011. If filtered average frequency 918 is greater than threshold 1011, then switch 1004 is set to output the value for filtered average frequency 918 into lookup tables 1008, 1010, and 1012. These lookup tables use filtered average frequency 918 to lookup and establish amplitude limits for different levels at the detected frequency. The amplitude limits are the maximum allowable amplitudes.

If filtered average frequency 918 exceeds the threshold in the comparison by comparator 1006, then filtered average frequency 918 is passed on to lookup tables 1008, 1010, and 1012 to look up the maximum allowable amplitude for filtered average frequency 918.

The results of the lookup, in these lookup tables, are processed in section 1014. This section includes comparators 1016, 1018, and 1020. Additionally, section 1014 also includes switches 1022, 1024, and 1026.

Summing node 1028 also is present in section 1014. Switch 1022 has an integer one and an integer zero as inputs. In a similar fashion, switches 1024 and 1026 have similar inputs. The particular input selected as outputs is based on comparisons made by comparators 1016, 1018, and 1020.

In addition to receiving the results of the maximum allowable amplitude from lookup tables 1008, 1010, and 1012, section 1014 also receives output 824 from section 804 in FIG. 8 and output 838 from section 826 in FIG. 8. Output 824 is the maximum amplitude detected and output 838 is the minimum amplitude detected. These two values are summed at summing node 1028 to calculate a peak-to-peak error signal amplitude, and a comparison is made with the values from tables 1008, 1010, and 1012 through comparators 1016, 1018, and 1020. The output of each of these comparators are set equal to true if the amplitude resulting from summing node 1028 is greater than the values from lookup tables 1008, 1010, and 1012 that are input into these comparators.

In these examples, the level command limits for tables 1008, 1010, and 1012 may be set, for example, using criteria from the Federal Aviation Association, other regulatory organizations, or safety parameters.

For example, table 1008 may contain a level 1A command limit, table 1010 may contain a level 1 command limit, and table 1012 may contain a level 2 command limit. Each level allows different amplitudes of oscillations, but also sets out detection and shutdown in a different number of cycles. Typically, the allowable amplitude will be inversely proportional to the number of cycles allowed for the given level. That is, a level with a high amplitude limit will require fault detection within a small number of cycles.

These different limits are used to identify the amplitude of oscillations at a selected frequency that may occur before they are considered instances that may be counted towards the threshold at which corrective action should be taken. In other words, the amplitude may be different at different frequencies. These amplitudes are referred to as amplitude limits.

The input into section 1030 is detected exceedance 862 from section 854 in FIG. 8. This input is used to increase the count for the number of cycles in which a given requirement is exceeded for different requirements.

Section 1030 provides a summation function that is used to add up the number of cycles in which a given requirement is exceeded. Section 1030 includes comparators 1032, 1034, and 1036. This section also includes switches 1038, 1040, 1042, 1044, 1046, and 1048. Summing nodes 1050, 1052, and 1054 also are present in section 1030 of threshold comparison unit 1000.

Comparator 1032, switch 1038, summing node 1050, and switch 1044 are used to track the total number of exceedances with a detected amplitude greater than the limit contained within lookup table 1008. Comparator 1034, switch 1040, switch 1046, and summing node 1052 are used to track the total number of exceedances with a detected amplitude greater than the limit contained within lookup table 1010. In a similar fashion, comparator 1036, switch 1042, switch 1048, and summing node 1054 are used to keep track of the number of exceedances for lookup table 1012. Each of these exceedances is compared with a threshold in section 1056, which includes comparators 1058, 1060, and 1062.

In this example, comparator 1058 compares threshold 1064 with the output from summing node 1050. Comparator 1060 compares threshold 1066 with the output from summing node 1052. Comparator 1062 compares threshold 1068 with the output from summing node 1054. The output of the summing nodes is the current number of cycles that have occurred where a given requirement for a threshold value has been exceeded.

If the number of exceedances for any of the levels exceeds any of these set thresholds, then a true value is output from comparator 1058, 1060, or 1062. Any true output results in a fault indication that is stored in output latch 1070. This output is fault indication 1072, in these examples.

In the example shown in FIGS. 10A and 10B, three different command limits are shown. Different advantageous embodiments may include any number of command limits similar to those shown. The different logic elements illustrated in FIGS. 8-10 may be implemented in hardware, software, or the combination of hardware or software.

Figure 11:
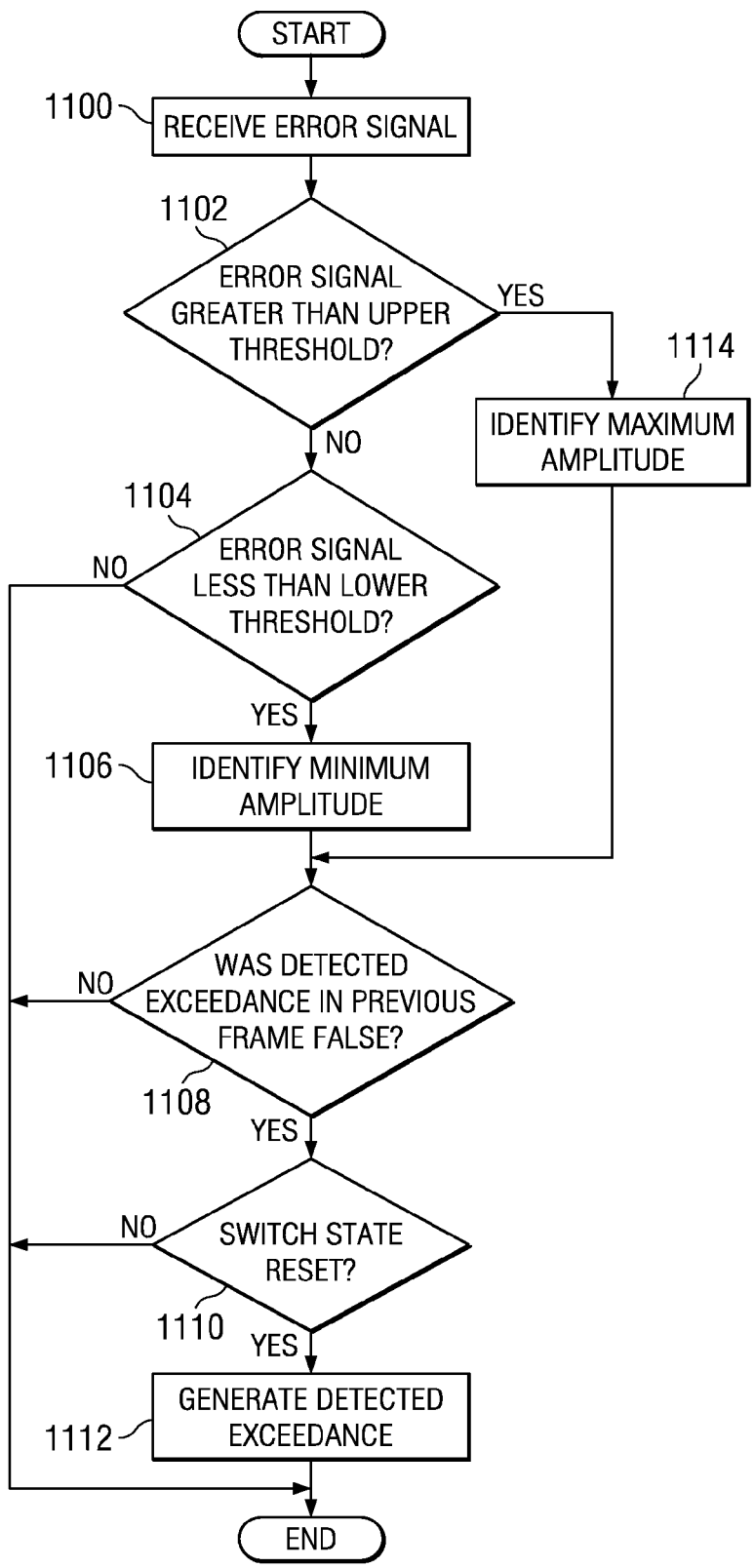
FIG. 11 is a flowchart of a process for amplitude and exceedance detection in accordance with an advantageous embodiment.

Turning now to FIG. 11, a flowchart of a process for amplitude and exceedance detection is depicted in accordance with an advantageous embodiment. The process illustrated in FIG. 11 may be implemented in a component, such as amplitude and exceedance detection unit 702 in FIG. 7.

The process begins by receiving an error signal (operation 1100). This error signal may be a filtered error signal and is the difference between the commanded position and the detected position for the actuator. A determination is made as to whether the error signal is greater than an upper threshold (operation 1102). The upper threshold is set to a value less than the minimum amount amplitude required to be detected, but high enough to prevent exceedances from being indicated because of a noise in the signal. In other words, operation 1102 is used to filter out noise in the received error signal.

If the error signal is not greater than an upper threshold, a determination is made as to whether the error signal is less than a lower threshold (operation 1104). This threshold performs a similar function to the one described with respect to operation 1102 in preventing noise in the signal from being identified as an exceedance. If the error signal is less a lower threshold, then a minimum amplitude is identified (operation 1106).

Next, a determination is made whether the detected exceedance was false in the previous computational frame (operation 1108). If the exceedance was detected as being false on the previous frame, a determination is made as to whether the previous detected exceedance was in the opposite direction, resulting in a reset of the switch state (operation 1110). If the switch state was reset, a detected exceedance is generated (operation 1112) with the sub-process terminating thereafter.

With reference again to operation 1102, if the error signal is greater than the upper threshold, the maximum amplitude is identified (operation 1114) and the process proceeds to operation 1108 as described above. The maximum amplitude is identified by determining whether the amplitude of the current error signal is greater than the greatest amplitude of previously detected error signals that exceeded the upper threshold. The minimum amplitude is identified by determining whether the amplitude of the current error signal is lower than the lowest amplitude of previously detected error signals that exceeded the lower threshold.

If the error signal was not greater than the upper threshold in operation 1102 or less than the lower threshold in operation 1104, the process terminates. With reference again to operation 1108, if the previous detected exceedance was not false, the process terminates. The process also terminates in operation 1110 if the previous detected exceedance was in the same direction, and thus the switch state was not reset. In other words, the process proceeds only on the first exceedance in a series of positive or negative exceedances.

Figure 12:
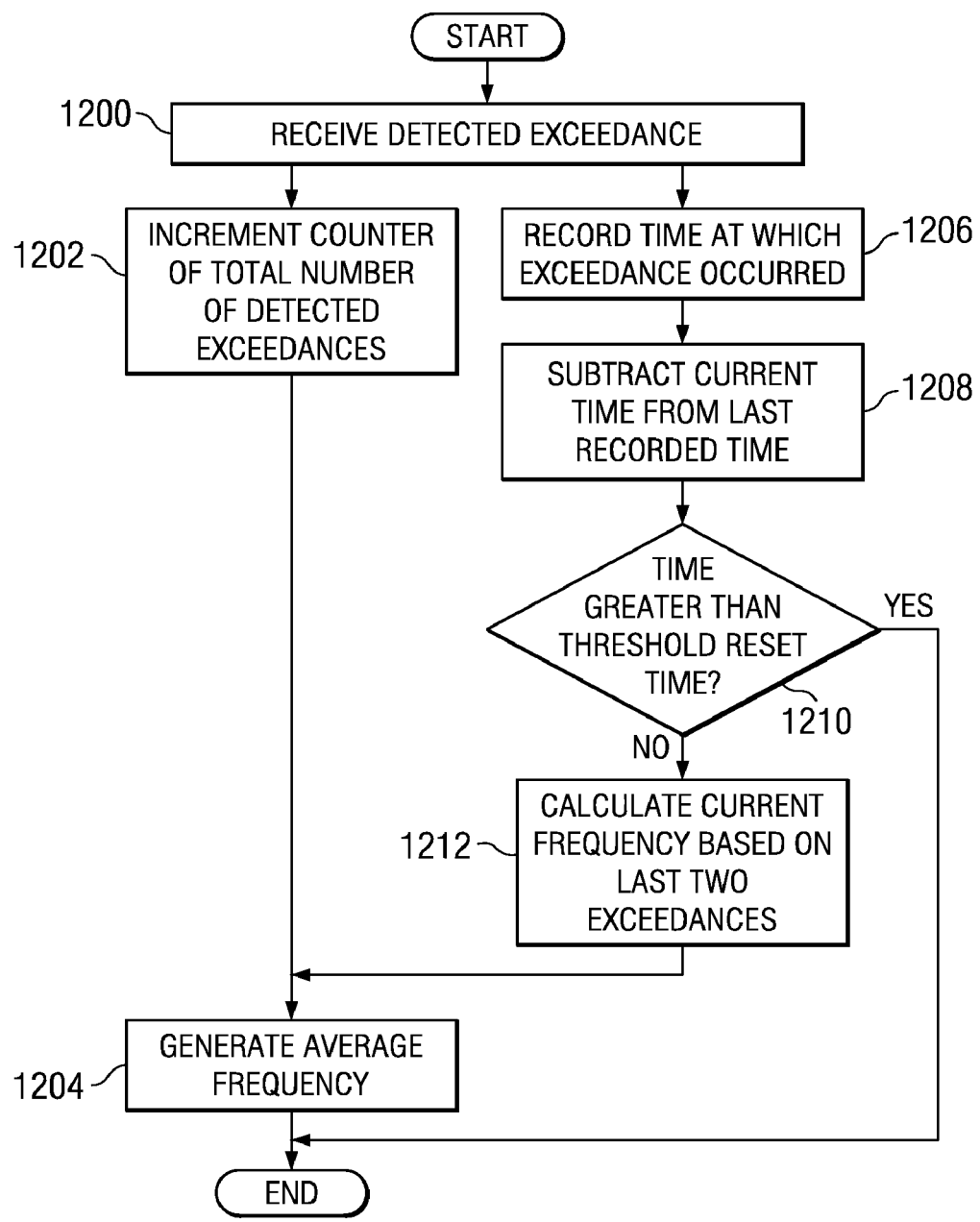
FIG. 12 is a flowchart of a process for identifying average frequencies in accordance with an advantageous embodiment.

With reference now to FIG. 12, a flowchart of a process for identifying average frequencies is depicted in accordance with an advantageous embodiment. The process illustrated in FIG. 12 may be implemented in a component, such as average frequency detection and reset unit 704 in FIG. 7.

The process begins by receiving a detected exceedance (operation 1200). This value is an integer value that is generated by the processes illustrated in FIGS. 10A and 10B when a detected exceedance occurs. Next, the process increments a counter of the total number of detected exceedances (operation 1202). Then, the value of the counter is used to generate an average frequency (operation 1204). The generation of an average frequency is the average of frequency of detected exceedances.

When the detected exceedance is received, the process records the time at which the detected exceedance occurred (operation 1206). Next, the new recorded time is subtracted from the previously recorded time (if applicable) (operation 1208).

Next, the process determines whether the time is greater than the threshold reset time (operation 1210). If this time is not greater than the threshold reset time, then this time interval is used to calculate a current frequency based on the last two exceedances (operation 1212). This value, and other previous current frequency values are then used in operation 1204 to generate the average frequency. With reference again to operation 1206, if the time is greater than the threshold reset time, the process terminates. In these examples, operations 1200-1202 and operations 1206-1212 may execute in parallel to reach operation 1204. Alternatively one set of operations may be executed first and wait for the execution of the other set of processes before executing process 1204.

Figure 13:
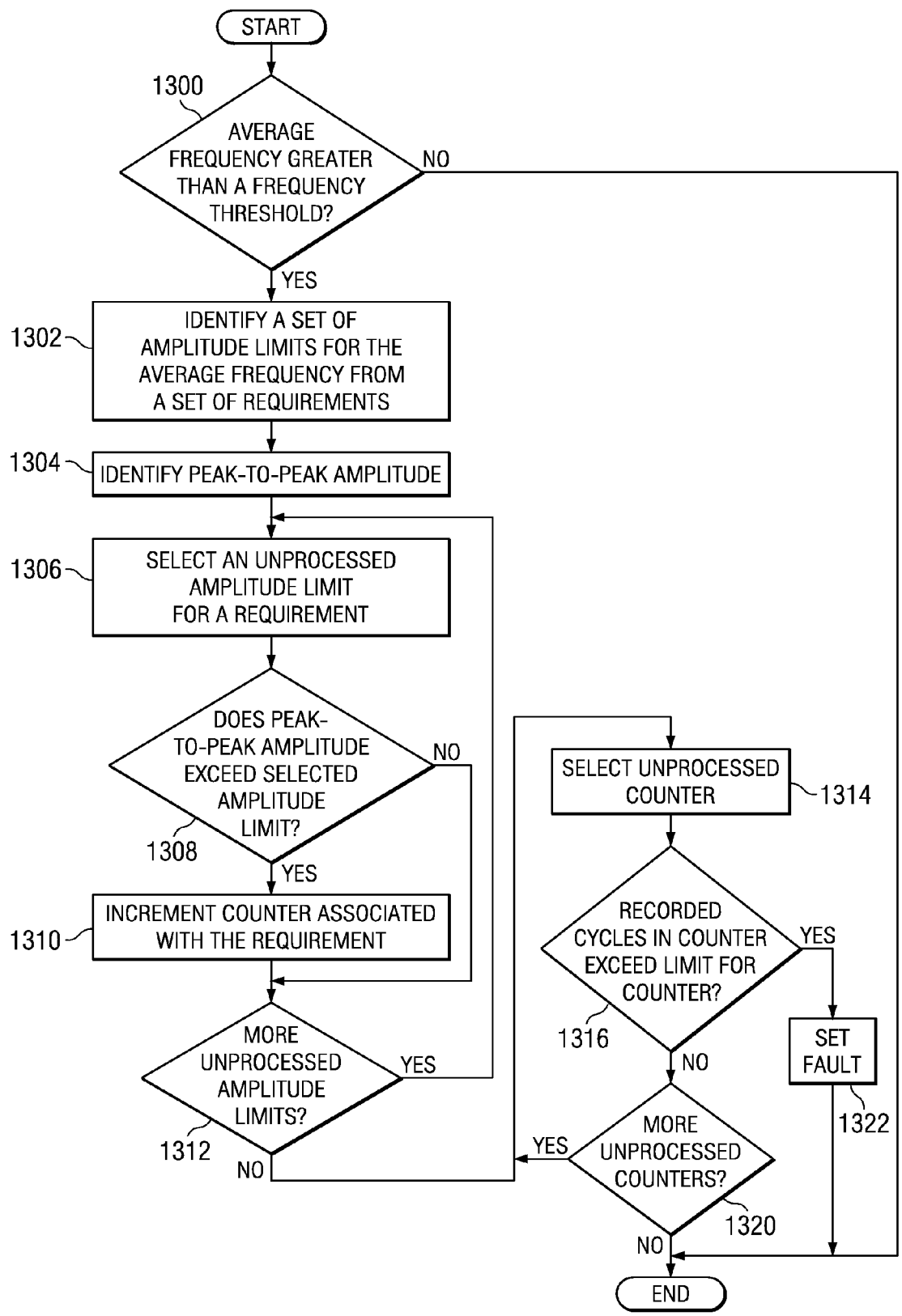
FIG. 13 is a flowchart of a process for performing threshold comparisons and determining whether a fault or failure has occurred in an actuator in accordance with an advantageous embodiment.

Turning now to FIG. 13, a flowchart of a process for performing threshold comparisons and determining whether a fault or failure has occurred in an actuator is depicted in accordance with an advantageous embodiment. The process illustrated in FIG. 13 may be implemented in a component, such as threshold comparison unit 606 in FIG. 6. In these examples, the process in FIG. 13 is initiated each time an average frequency value is generated.

The process begins by determining whether the average frequency is greater than a frequency threshold (operation 1300). This operation is used to eliminate low average frequencies. If the average frequency is greater than a frequency threshold, a set of amplitude limits is identified for the average frequency from a set of requirements (operation 1302). Each requirement in the set of requirements identifies maximum amplitudes that may occur for different frequencies. This information may be identified using lookup tables, such as lookup tables 1008, 1010, and 1012 in FIG. 10A. The average frequency value is used to identify the amplitude limit at that frequency from each of these lookup tables.

Thereafter, a peak-to-peak amplitude is identified (operation 1304). This value is identified from the maximum and minimum amplitudes as identified in the process in FIG. 11 above. The process then selects an unprocessed amplitude limit for one of requirements (operation 1306). A determination is then made as to whether the peak-to-peak amplitude exceeds the selected amplitude limit (operation 1308).

If the peak-to-peak amplitude exceeds the amplitude limit, the process increments a counter associated with the requirement (operation 1310). A counter is present for each requirement used. Each of these counters is incremented each time the peak-to-peak amplitude exceeds the amplitude limit for that particular table.

Next, the process determines whether more unprocessed amplitude limits are present (operation 1312). If additional unprocessed amplitude limits are present, the process returns to operation 1306 to select another unprocessed amplitude limit for comparison. Otherwise, the process selects an unprocessed counter from the counters (operation 1314).

A determination is made as to whether the recorded cycles in the selected counter exceed the limit for the counter (operation 1316). The requirements specify the limits associated with each counter. When a limit is exceeded, a fault is considered to be present in the actuator. If the recorded cycles in the counter do not exceed the limit for the counter, a determination is made as to whether more unprocessed counters are present (operation 1320). If additional unprocessed counters are not present, the process terminates. Otherwise, the process returns to operation 1314 to select another counter.

With reference again to operation 1316, if the recorded cycles in the counter exceed the limit for the counter, then a fault is set (operation 1322) with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Turning now to FIG. 14, a diagram illustrating code for performing an average frequency function is depicted in accordance with an advantageous embodiment. In this example, code 1400 is written in FORTRAN and includes a single frame frequency calculation in section 1402. Section 1402 includes code to calculate a frequency value based on the amount of time that is passed between the last registered detected exceedance and the current time when a new detected exceedance is registered. This value is passed in the variable freq_cur to section 1404, which stores the last five frequencies calculated in section 1402.

When a new detected exceedance is registered, the variable in freq_cur is moved to the variable freq_prev1 in line 1406. In a similar fashion, the value in freq_prev1 is stored into the variable freq_prev2 in line 1408. The value for the variable freq_prev2 is stored into the variable freq_prev3 in line 1410 and the value for the variable freq_prev3 is stored in the variable freq_prev4 in line 1412.

In this example, section 1414 in code 1400 calculates an average frequency by averaging the past five single frame frequency values stored in section 1404. The number of past frequencies used in this calculation is selected to allow a monitor to respond to signals of changing frequencies, while still maintaining a sufficient number of data points to filter out noise and compensate for inaccuracies and time measurements due to discrete sampling. The result of section 1414 is the average frequency generated by average frequency function 808 in FIG. 8.

Although the depicted example in FIG. 14 is written in FORTRAN code for this and other functions, in the different examples, may be written using other languages. For example, C and C++ are examples of other languages that may be used.

Thus, the different advantageous embodiments provide a method, apparatus, and computer usable program code for monitoring oscillations. An error signal is received from taking the difference between the position command to the actuator, and the position of the actuator piston as measured by a sensor. A frequency and an amplitude for the error signal is identified. A current number of times any amplitude limit has been exceeded by the amplitude for the error signal is identified, wherein an amplitude limit is identified by the frequency of the error signal. A fault is set if the current number of times exceeds a threshold.

The description of the different advantageous embodiments has been presented for purposes of illustration and description, and is not intended to be exhaustive or limited to the form disclosed. Many modifications and variations will be apparent to those of ordinary skill in the art. Although the depicted embodiments are directed towards control surfaces on an aircraft, other embodiments may be directed towards control surfaces or other movable surfaces on other types of vehicles. For example, the different advantageous embodiments may be directed towards control surfaces on a spacecraft, a submarine, or a race car. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A method for monitoring an actuator for a control surface on an aircraft, the method comprising:
   receiving an error signal generated in response to sending a command to the actuator to move the control surface on the aircraft;
   responsive to receiving the error signal, identifying an amplitude and a frequency for the error signal;
   determining whether the amplitude exceeds a set of amplitude limits for the frequency, wherein each amplitude in the set of amplitude limits is associated with a requirement in a set of requirements;
   incrementing an exceedance count for each requirement in the set of requirements in which an associated amplitude limit has been exceeded by the amplitude to form an updated set of exceedance counts; and
   generating a fault indication if any exceedance count in the updated set of exceedance counts is greater than a threshold.

2. The method of claim 1, wherein the frequency for the error signal is an averaged frequency.

3. The method of claim 1 further comprising:
   responsive to a generation of the fault indication, preventing use of the actuator to control the control surface.

4. The method of claim 3 further comprising:
   responsive to the generation of the fault indication, using a second actuator to control the control surface.

5. The method of claim 1 further comprising:
   sending the command to the actuator to move to a commanded position;
   receiving feedback identifying an actual position for the actuator in response to the command; and
   generating an error signal from a difference between the commanded position and the actual position to generate the error signal.

6. The method of claim 5, wherein the generating step comprises:
   generating an initial error signal from the difference between the commanded position and the actual position; and
   filtering the initial error signal to generate the error signal.

7. The method of claim 1, wherein the control surface is selected from a group comprising an aileron, a spoiler, a elevator, a rudder, or a flaperon.

8. The method of claim 1, wherein the set of amplitude limits for the frequency are identified from a set of tables containing amplitude limits for different frequencies.

9. The method of claim 1, wherein the method is implemented in one of hardware, software, or hardware and software.

10. A method for monitoring oscillations, the method comprising:
    receiving an error signal from sending a command to a part controlled by an actuator;
    identifying a frequency and an amplitude for the error signal;
    identifying a current number of times any amplitude limit has been exceeded by the amplitude for the error signal, wherein the amplitude limit is identified by the frequency of the error signal; and
    generating a fault indication if the current number of times exceeds a threshold.

11. The method of claim 10, wherein the part is a control surface on an aircraft.

12. The method of claim 11, wherein the control surface is selected from a group comprising an aileron, a spoiler, a elevator, a rudder, or a flaperon.

13. The method of claim 10 further comprising:
    responsive to a generation of the fault indication, preventing use of the actuator to control the part.

14. The method of claim 13 further comprising:
    responsive to the generation of the fault indication, using a second actuator to control the part.

15. The method of claim 10 further comprising:
    initiating a corrective action when the fault indication is generated.

16. The method of claim 10, wherein the control surface is located on one of an aircraft, a spacecraft, a submarine, and a race car.

17. An apparatus comprising:
    an electro-hydraulic actuator capable of receiving a command to change a position of a control surface to a command position and controlling the surface using received commands; and
    a health monitoring system capable of receiving data regarding the commanded position and an actual position for the electro-hydraulic actuator, generating an error signal from a difference between the commanded position and the actual position, calculating a frequency and an amplitude for the error signal, comparing the amplitude to a threshold that is selected based on the frequency, and selectively generating a fault indication when the threshold is exceeded.

18. The apparatus of claim 17, wherein the health monitoring system determines whether a number of times thresholds based on frequencies of errors signals have been exceeded exceed a limit to selectively generate the fault.

19. The apparatus of claim 17, wherein the health monitoring system is capable of initiating a corrective action if the fault indication is generated.

20. The apparatus of claim 19, wherein the corrective action is to use a backup actuator in place of the electro-hydraulic actuator to change the position of the control surface.

* * * * *